United States Patent
Lee et al.

[11] 3,873,334
[45] Mar. 25, 1975

[54] ACETOXYSILICON ADHESION PROMOTER AND PRIMER COMPOSITION

[75] Inventors: Chi-Long Lee, Midland; Jay R. Schulz, Bangor Township, both of Mich.

[73] Assignee: Dow Corning Corporation, Midland, Mich.

[22] Filed: May 20, 1974

[21] Appl. No.: 471,386

Related U.S. Application Data

[62] Division of Ser. No. 406,065, Oct. 12, 1973.

[52] U.S. Cl. .................... 106/287 SE, 106/287 SB
[51] Int. Cl. .................................. C09k 3/00
[58] Field of Search ................ 106/287 SB, 287 SE

[56] References Cited
UNITED STATES PATENTS
3,498,824   3/1970   Chadha .................... 106/287 SB X Primary Examiner—Lewis T. Jacobs
Attorney, Agent, or Firm—Roger H. Borrousch

[57] ABSTRACT

Reaction products obtained by mixing under anhydrous conditions

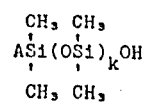

where $k$ is 0 to 20 and A is methyl or vinyl and

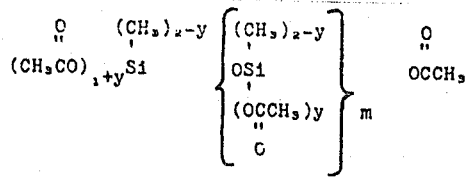

where $m$ is 0 to 5 and $y$ is 1 or 2 are adhesion promoters which are useful in primer compositions. The primer compositions are organic solvent solutions with 50 to 99.9 weight percent organic solvent, with the balance being made up of 5 to 100 weight percent of the adhesion promoter, 0 to 50 weight percent of an alkylsilicate and 0 to 50 weight percent of an organotitanate. An example of a primer composition would be a solution of 76.9 weight percent inhibited 1,1,1-trichloroethane with 23.1 weight percent of equal weight amounts of an adhesion promoter where A is vinyl, $k$ is 3 and $m$ has an average value of about 0.7, ethylpolysilicate and bis(acetylacetonyl)diisopropyltitanate. The primer compositions are useful in adhering room temperature vulcanizable silicone elastomers to substrates such as aluminum.

7 Claims, No Drawings

ACETOXYSILICON ADHESION PROMOTER AND PRIMER COMPOSITION

This is a division, of application Ser. No. 406,065, filed Oct. 12, 1973.

BACKGROUND OF THE INVENTION

1. Field of the Invention

This invention relates to an adhesion promoter and primer compositions prepared therefrom.

2. Description of prior art

Adhering silicone elastomers to various substrates is a continuing problem. There is an ever present need for better adhesion. With the changing substrates and silicone elastomers, the search for new methods of adhering the silicone rubber to substrates and for new materials to provide adhesion continues. One particular area wherein adhesion is required, is the application where room temperature vulcanizable silicone elastomer is to be adhered to substrates, such as metals. Many of the prior art methods of adhering silicone rubber to substrates are not suitable for today's materials, provide an insufficient bond strength or are too expensive because of the complex method or materials.

Keil in U.S. Pat. No. 2,751,314 teaches that silicone rubber can be adhered to the surface of a solid by depositing a continuous coating having 50 to 100 percent by weight of an organotitanate and 0 to 50 weight percent alkylpolysilicate, depositing over this coating another coating having 1 to 10 percent by weight alkylpolysilicate and 90 to 99.9 of a toluene soluble organopolysiloxane, thereafter applying a silicone rubber such as a room temperature vulcanizable silicone rubber. While this method described by Keil does bond silicone rubber to a substrate, it requires two coatings to provide an adequate bond and it also shows that a silicone rubber layer containing alkylpolysilicate must be deposited over the titanate primer layer to achieve adequate bonding.

Harper in U.S. Pat. No. 2,979,420 teaches that a room temperature vulcanizing silicone rubber can be bonded to a surface by applying certain monoorganotriacyloxysilanes to the surface as a primer. Although this method is simple, the bonding achieved is insufficient in strength for many applications.

Chadha in U.S. Pat. No. 3,498,824 teaches that an alkoxyacyloxysilane can be used as a primer to adhere room temperature vulcanizing silicone rubber to metal substrates. Although the bond strength is improved with this primer compared to no primer, the bond strength is insufficient under many circumstances.

Young in U.S. Pat. No. 3,671,483 teaches that certain compositions are useful as primers for adhering silicone rubber to epoxy resin and polyurethane substrates. The compositions described contain alkylsilicates, organotitanates, solvent and a compound of the formula

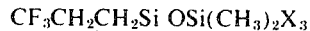

$$CF_3CH_2CH_2Si\ OSi(CH_3)_2X_3$$

where X is $-CH_2CH_2Si(OOCCH_3)_3$ or a hydrogen atom and at least one X is $-CH_2CH_2Si(OOCCH_3)_3$. These primers provide useful adhesion, but have insufficient bond strength and those which contain silicon bonded hydrogen atoms form gas on storage.

Matherly in U.S. Pat. No. 3,714,109 teaches a mixture of an organic solvent, bis(acetylacetonyl)diisopropyltitanate, an alkylpolysilicate and a mixture containing an organosiloxane having dimethylsiloxane units and methylhydrogensiloxane units and trimethylsiloxane units or dimethylhydrogensiloxane units and a modified organosiloxane having in addition to the above siloxane units, $(CH_3COO)_3SiCH_2CH_2(CH_3)SiO$ units and $(CH_3COO)_3SiCH_2CH_2(CH_3)_2-SiO_{0.5}$ units. These primer compositions are suitable for adhering silicone rubber to substrates in certain applications but have insufficient bond strength for many applications and additionally have a potential to form hydrogen gas because of the presence of silicon bonded hydrogen atoms.

There are many other methods used to adhere silicone rubber to substrates, most do not achieve bond strengths of the magnitude obtained by the compositions of the present invention and those which approach such strengths have other limitations, such as decreasing strengths on standing, loss of adhesion by heat aging, by solvent action and the like.

SUMMARY OF THE INVENTION

An object of this invention is to provide a composition suitable for providing strong adhesive bonds between room temperature vulcanizable silicone elastomers and substrates. This invention relates to an adhesion promoter prepared by mixing vinylsiloxane and an acetoxysilicon compound, to compositions consisting essentially of an adhesion promoter, an alkylsilicate and an organotitanate in an organic solvent solution. These compositions are useful as primers when applied to substrates such as metals, and thereafter curing silicone elastomers on this primed surface. Silicone elastomers cured by the reaction of alkenylsiloxane, silicon-bonded hydrogen atoms and a platinum catalyst adhere particularly well whereas other primers do not provide as good adhesion for this type of silicone elastomer.

DESCRIPTION OF THE INVENTION

This invention relates to a composition under anhydrous conditions consisting essentially of an organic solvent solution of (a) a reaction product obtained by mixing under essentially anhydrous conditions (1) an organosiloxane of the formula

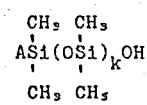

in which A is a monovalent radical selected from the group consisting of vinyl and methyl radicals and $k$ has an average value of from 0 to 20 inclusive where the organosiloxane species having values of $k$ above 20, if present, are in no more than minor amounts and (2) an acetoxysilicon compound of the formula

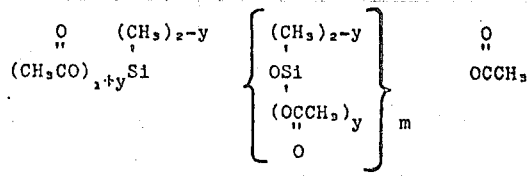

in which $m$ has an average value of from 0 to 5 inclusive and $y$ is 1 or 2, (1) and (2) being mixed in proportions to provide a ratio of hydroxyl in (1) to acetoxy in (2) of from 1/14 to ⅔, (b) an alkyl silicate selected from the group consisting of ethylorthosilicate, propylorthosilicate, ethylpolysilicate and propylpolysilicate, and (c) an organotitanate of the formula Ti(OR)$_4$ wherein each —OR is a monovalent radical selected from the group consisting of alkoxy radicals having from 1 to 5 carbon atoms and acetylacetonoxy, (a) provides 5 to 100 weight percent, (b) provides 0 to 50 weight percent and (c) provides 0 to 50 wieght percent, where (a), (b) and (c) equals 100 weight percent, said organic solvent solution being from 50 to 99.9 weight percent of an organic solvent selected from the group consisting of ketones, halogenated hydrocarbons and hydrocarbons all having boiling points no greater than 150°C.

The compositions are prepared and stored under essentially anhydrous conditions, because the acetoxy functionality on the silicon compounds is reactive with moisture.

The reaction product (a) is prepared by mixing an organosiloxane and an acetoxysilicon compound under anhydrous conditions. The organosiloxane (1) has a formula

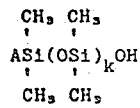

where A is vinyl or methyl and $k$ has an average valve of 0 to 20. The organosiloxanes having species of $k$ above 20 should contain only minor amounts of such species. The preferred organosiloxanes are those in which A is vinyl and $k$ has an average value of 1 to 7. Some specific species include

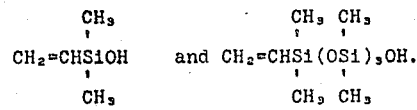

A number of methods are known in the art for the preparation of the organosiloxanes of (1). One method is described by Brown and Hyde in U.S. Pat. No. 3,162,662 wherein a triorganochlorosilane can be reacted with hexamethylcyclotrisiloxane in the presence of acetonitrile and N,N-dimethylacetamide. For this invention, the triorganochlorosilane would be trimethylchlorosilane or dimethylvinylchlorosilane. This method provides a monochlorine endblocked diorganopolysiloxane which can then be hydrolyzed under mild hydrolysis conditions to silanol. The hydrolysis of trimethylchlorosilane and dimethylvinylchlorosilane form the corresponding silanols under mild hydrolysis conditions. By mild hydrolysis conditions, it is to be understood that condensation of the newly formed silanols is minimized where this can readily be accomplished by the use of buffered solutions to keep the pH about 7. The organosiloxanes having various $k$ values can be prepared by allowing the reaction between the chlorosilane and cyclotrisiloxane to continue over various periods of time and then separating the resulting mixture by such methods as the spinning band technique. The separations can be used to obtain single species or mixtures having a desirable average $k$ value. U.S. Pat. No. 3,162,662 is hereby incorporated by reference to show the preparation of the chlorine endblocked organosiloxanes which can be hydrolyzed to the organosiloxanes (1).

The acetoxysilicon compounds (2) have a formula

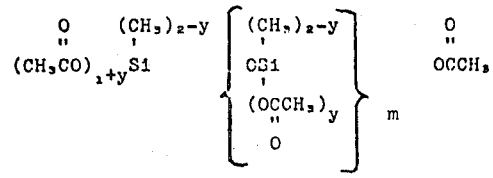

where $m$ is 0 to 5 and $y$ is 1 or 2. Specific examples of the acetoxysilicon compound (2) include methyltriacetoxysilane, tetraacetoxysilane and partial hydrolyzates thereof to provide the values of $m$ from above 0 to 5. These partial hydroyzates of the silanes such as methyltriacetoxysilane can be readily obtained by slowly adding the necessary amount of water to the methyltriacetoxysilane to obtain the desired average value of $m$. Theoretically it requires one half mole of water per mole of acetoxy to hydrolyze and condense. The partial hydrolyzates having an average value for $m$ of 0.5 to 1 are the preferred acetoxysilicon compounds wherein optpimum adhesion results are obtained in priming compositions prepared therefrom.

The organosiloxane (1) and the acetoxysilicon compound can be mixed in proportions to provide a ratio of hydroxyl in (1) to acetoxy in (2) of from 1/14 to ⅔, preferably from ⅛ to ½. As long as (1) and (2) are mixed under essentially anhydrous conditions, the product obtained is useful as an adhesion promoter, particularly in the primer compositions. This reaction product can be prepared and used in making the primer compositions or the organosiloxane (1) and the acetoxysilicon compound (2) can be added separately in making the primer composition.

The alkylsilicates of (b) are known in the art and include ethylorthosilicate, propylorthosilicate, ethylpolysilicate and propylpolysilicate. These materials can be purchased commercially. The preferred alkylsilicate is ethylpolysilicate.

The organotitanates of (c) have a formula $$Ti(OR)_4$$

where each —OR is an alkoxy radical of 1 to 5 carbon atoms such as methoxy, ethoxy, propoxy, isopropoxy, butoxy and amyloxy or acetylacetonoxy. Specific examples include, tetrabutyltitanate, tetraisopropyltitanate, bis(acetylacetonyl)diisopropyltitanate, bis(acetylacetonyl)diethyltitanate, bis(acetylacetonyl)dimethyltitanate and tetramethyltitanate. The preferred organotitanate (c) is bis(acetylacetonyl)diisopropyltitanate.

The organic solvents are those which have boiling points no greater than 150°C. and include ketones such as acetone, methylethylketone, methylisobutylketone, methylpropylketone, diethylketone, methyl-n-butylketone, ethylpropylketone, dipropylketone and butylethylketone; hydrocarbons such as hexane, pentane, heptane, octane, light naphthas and benzene and halogenated hydrocarbons such as 1,1,1-trichloroethane, carbon tetrachloride, trichloroethylene, perchloroethylene, monochlorobenzene and trichlorotrifluoroethane.

The primer compositions are prepared by mixing the ingredients under essentially anhydrous conditions and the compositions are stored under anhydrous conditions until used. The order of mixing these ingredients is not narrowly critical, except that the best results are obtained when the organotitanate is added last. Preferably, the adhesion promoter is added to the organic solvent, followed by the alkylsilicate and the organotitanate. In those compositions wherein the reaction product is not used and the organosiloxane (1) and acetoxysilicon compound (2) are added separately, the order of addition of (1) and (2) is not critical.

The primer compositions can be prepared with 50 to 99.9 weight percent organic solvent. The best results are obtained with the more dilute solutions such as from 75 to 99 weight percent organic solvent. The remainder of the primer composition, 0.1 to 50 weight percent is adhesion promoter (a) or a combination of (1) and (2) and, if present, alkylsilicate (b) and organotitanate (c), where these ingredients make up 100 weight percent of the remainder.

Primer compositions can be prepared where the ingredients other than organic solvent are 5 to 100 weight percent adhesion promoter (a) or a combination of (1) and (2) when added separately, from 0 to 50 weight percent alkylsilicate (b) and 0 to 50 weight percent organotitanate (c). Preferably (b) is present in at least 10 weight percent and (c) is present in at least 4 weight percent. The primer compositions which were found to provide the best adhesion of silicone elastomer to substrates are those which contain at least 10 weight percent (a), at least 20 weight percent (b) and at least 10 weight percent (c).

The primer compositions are applied to the substrate surfaces to which silicone elastomer is to be applied, in extremely thin layers. The primer composition can be applied by wiping, brushing, spraying and the like. The best results are obtained when, as much of the primer composition is wiped off, after being applied, as possible. After the substrate has been primed, the solvent evaporates before the silicone elastomer is placed over the primed surface. The silicone elastomer can then be either cured at room temperature or heat vulcanized. The resulting cured silicone rubber is securely bonded to the substrate. This primer composition is particularly suited for metal substrates, such as aluminum, stainless steel, titanium and the like. The silicone elastomers can be either pourable compositions or flowable compositions which can be extruded from a tube or stiff compositions which are prepared from gum bases.

The primer compositions of this invention are particularly useful for silicone elastomers which cure by the addition reaction of silicon-bonded alkenyl radicals with silicon-bonded hydrogen atoms in the presence of a platinum catalyst. These silicone elastomers are known to the art and are available commercially in many forms.

The following examples are presented for illustrative purposes only and should not be construed as limiting the present invention which is properly delineated in the claims.

EXAMPLE 1

To a five liter flask, 436 grams of acetonitrile and 43.6 grams of N,N-dimethylacetamide was added and 1334 grams of hexamethylcyclotrisiloxane was dissolved therein. To this solution, 844 grams of dimethylvinylchlorosilane was added and the mixture was stirred for 20 hours at room temperature. This mixture was stripped for three hours to a head temperature of 30°C. at 2 mm of mercury and then fractionated on a vigreux column taking 40 ml. cuts. The product was obtained at about 65°C. at 0.7 mm of mercury, and had a formula

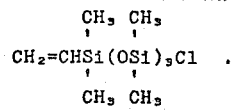

In a three liter flask, suspended in an ice bath and fitted with a stirring bar, a mixture of 35.85 grams of concentrated ammonium hydroxide, 579 grams of diethylether and 409 grams of ice was stirred until the ice in the flask was melted. To this mixture, while rapidly stirring, 200 grams of

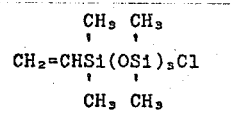

was poured into the flask. The rapid stirring was continued for five minutes and the water was separated using a separatory funnel. The ether layer was washed with water until the water was neutral. The ether layer was then stripped under vacuum to a pot temperature of 50°C. The product was 100 percent pure as indicated by gas-liquid chromatography and infrared analyses, with a 94.9 percent yield of vinylsiloxane of the formula

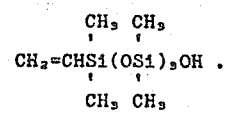

In a three liter flask, 1838 grams of methyltriacetoxysilane was heated to about 40°C. This silane was stirred rapidly while beginning to add 62.4 ml of water slowly from an addition funnel. After the first few milliliters, the temperature was reduced with an ice bath. The total addition time was about 1 hour. Volatile materials were removed under reduced pressure. The resulting partial hydrolyzate had a formula

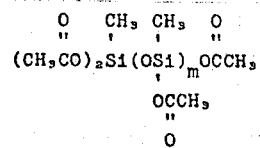

wherein $m$ had an average of about 0.7.

An adhesion promoter was prepared by slowly adding over a one hour period 287.5 grams of

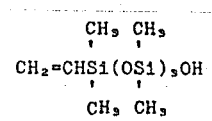

to 287.5 grams of the partial hydrolyzate prepared above. The product contained no hydroxyl radicals and was stored in a sealed polyethylene container.

EXAMPLE 2

Primer compositions were prepared by mixing under essentially anhydrous conditions in Chlorothene (Trademark of the Dow Chemical Company, Midland, Mich. for an inhibited 1,1,1-trichloroethane) the adhesion promoter prepared by Example 1, ethylpolysilicate and bis(acetylacetonyl)diisopropyltitanate. The amounts used were as shown in Table I. The primer compositions were wiped on aluminum test panels, then rubbed vigorously to remove any excess amounts, allowed to stand at least one hour before applying a silicone elastomer to make the adhesion test panels. The silicone elastomer was the same in each test and was basically a diorganopolysiloxane containing methyl and vinyl radicals, an organosilicon compound containing silicon-bonded hydrogen atoms and a platinum catalyst. The test panels were prepared and tested in accordance with the procedure set forth in ASTM-Designation: C273-61 (Reapproved 1970). The silicone elastomer was cured on the panel by heating for 1 hour at 150°C. The results for this lap shear adhesion test were reported in pounds per square inch and percent cohesive failure. The test results were as shown in Table I. The panels were tested the same day they were prepared.

EXAMPLE 3

Test panels were prepared and tested as described in Example 2 using the same materials. After the test panels were made, they were aged at room temperature for 1 day before the lap shear test was done. The results were as shown in Table II.

Table II

| Test No. | Number of Panels Tested | Primer Composition Weight percent Chlorothene | Weight percent Reactive Ingredients | Composition of Reaction Ingredients in weight percent | | | Lap Shear Test | |
|---|---|---|---|---|---|---|---|---|
| | | | | Adhesion Promoter | Ethylpoly-silicate | Titanate | Adhesive Strength, p.s.i. | % Cohesive Failure |
| 1 | 33 | none | none | none | none | none | 139.3 | 0 |
| 2 | 31 | 76.9 | 23.1 | 33.3 | 33.3 | 33.3 | 902.7 | 99.2 |
| 3 | 10 | 80.0 | 20.0 | 40.0 | 20.0 | 40.0 | 835.4 | 75.5 |
| 4 | 4 | 81.6 | 18.4 | 44.5 | 33.3 | 22.2 | 779 | 80 |
| 5 | 5 | 78.4 | 21.6 | 36.4 | 36.4 | 27.2 | 683 | 41 |
| 6 | 5 | 80.0 | 20.0 | 40.0 | 40.0 | 20.0 | 769.2 | 67.6 |
| 7 | 5 | 83.3 | 16.7 | 50.0 | 50.0 | 0.0 | 965.4 | 98 |

EXAMPLE 4

To show the advantage of using an extremely thin layer of primer composition, test panels were prepared as described in Example 3, Test No. 2 using the same materials and cure conditions, except the prepared test panels were allowed to stand two days after the silicone elastomer was cured before the lap shear test was done. In one test, the primed panels were rubbed to remove as much primer composition as possible. In a second test, the primer composition was wiped on and no further effort was used to remove any primer composition. In the first test, an average for five panels had an adhesive strength of 907.8 p.s.i. with 99.8 percent cohesive failure and in the second test, an average for five panels had an adhesive strength of 772.2 with 63 percent cohesive failure.

EXAMPLE 5

Adhesion promoters were prepared by mixing in varying weight ratios, the vinylsiloxane of the formula Table I

| Test No. | Number of Panels Tested | Primer Composition Weight percent Chlorothene | Weight percent Reactive Ingredients | Composition of Reactive Ingredients in weight percent | | | Lap Shear Test | |
|---|---|---|---|---|---|---|---|---|
| | | | | Adhesion Promoter | Ethylpoly-silicate | Titanate | Adhesive Strength, p.s.i. | % Cohesive Failure |
| 1 | 27 | none | none | none | none | none | 176 | 0 |
| 2 | 5 | 99.1 | 0.9 | 33.3 | 33.3 | 33.3 | 854.4 | 73.4 |
| 3 | 8 | 94.7 | 5.7 | 33.3 | 33.3 | 33.3 | 827 | 95 |
| 4 | 8 | 89.3 | 10.7 | 33.3 | 33.3 | 33.3 | 823 | 85 |
| 5 | 8 | 87.0 | 13.0 | 33.3 | 33.3 | 33.3 | 767 | 93 |
| 6 | 39 | 76.9 | 23.1 | 33.3 | 33.3 | 33.3 | 804.1 | 85.7 |
| 7 | 10 | 81.6 | 18.4 | 44.5 | 44.5 | 11.0 | 929.7 | 100 |
| 8 | 5 | 81.6 | 18.4 | 44.5 | 11.0 | 44.5 | 669 | 37 |
| 9 | 5 | 74.1 | 25.9 | 28.6 | 42.8 | 28.6 | 873.6 | 88.6 |
| 10 | 5 | 76.9 | 23.1 | 33.3(1) | 33.3 | 33.3 | 653.5 | 11 |

(1)Adhesion promoter prepared same as in Example 1, except (CH$_3$)$_3$SiCl substituted for (CH$_2$=CH)(CH$_3$)$_2$SiCl in the proper molar amount.

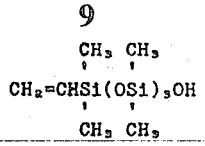

and the partial hydrolyzate as described in Example 1. The weight ratios were as shown in Table III. Primer compositions were prepared containing 76.9 weight percent Chlorothene and 23.1 weight percent reactive ingredients which were the adhesion promoter, ethylpolysilicate and bis(acetylacetonyl)diisopropyltitanate present in equal weight amounts. Test panels were prepared and tested as described in Example 1. The lap shear test results were as shown in Table III. The results are averages for five panels for each test.

Table III

| | Adhesion Promoter | | Lap Shear Test | |
|---|---|---|---|---|
| Test No. | Vinylsiloxane, weight percent | Partial hydrolyzate, weight percent | Adhesive Strength, p.s.i. | % Cohesive Failure |
| 1 | 75 | 25 | 723 | 40 |
| 2 | 66.7 | 33.3 | 819 | 85.6 |
| 3 | 50 | 50 | 863 | 78 |
| 4 | 33.3 | 66.7 | 759 | 79 |
| 5 | 25 | 75 | 701 | 59 |

EXAMPLE 6

Test panels were prepared and tested as described in Example 2 using the same materials. After these test panels were made, they were aged at room temperature for four days before the lap shear test was done. The results were as shown in Table IV wherein various primer compositions were tested.

EXAMPLE 7

Test panels were prepared as described in Example 2, Test No. 6 where the room temperature vulcanizable silicone elastomer was allowed to cure at room temperature for a specified period of time before testing. The other conditions of the test were the same and the materials used were the same. The results of the lap shear test were as shown in Table V.

Table V

| | | | Lap Shear Test | |
|---|---|---|---|---|
| Test No. | Number of Panels Tested | Days RTV Allowed To Cure | Adhesive Strength, p.s.i. | % Cohesive Failure |
| 1 | 8 | 7 | 618.5 | 42.5 |
| 2 | 2 | 37 | 840 | 95 |
| 3 | 2 | 69 | 867.5 | 97 |

EXAMPLE 8

The bond between aluminum and silicone elastomer using the primer compositions of this invention were examined after aging conditions. Both heat aging and aging in contact with water were used. Test panels were prepared and tested as described in Example 2, Test No. 6. The aging conditions and the test results were as shown in Table VI.

Table VI

| Test No. | Number of Panels Tested | Heat aging Temperature, °C. | Length of Time Aged, | Temperature of Water | Length of Time in contact with water | Time allowed to dry before testing | Adhesive Strength, p.s.i. | % Cohesive Failure |
|---|---|---|---|---|---|---|---|---|
| 1 | 2[3] | 150 | 8 days | — | — | — | 728 | 30 |
| 2 | 7 | 150 | 8 days | — | — | — | 1149 | 100 |
| 3 | 2 | 250 | 113 hours | — | — | — | 567 | 100 |
| 4 | 2 | 250 | 12 days | — | — | — | 335 | 6 |
| 5 | 2 | 250 | 23 days | — | — | — | 292.5 | 0 |
| 6 | 2 | — | — | Boiling | 7 hours | 4 days | 956 | 100 |
| 7 | 2 | — | — | Boiling | 24 hours | 4 days | 762.5 | 20 |
| 8 | 2 | — | — | Room Temperature | 12 days | 2 days | 823 | 100 |

[3]Control, no primer used.

Table IV

| Test No. | Number of Panels Tested | Primer Composition Weight percent Chlorothene | Weight percent Reactive Ingredients | Composition of Reactive Ingredients in weight percent | | | Lap Shear Test | |
|---|---|---|---|---|---|---|---|---|
| | | | | Adhesion Promoter | Ethylpolysilicate | Titarate | Adhesive Strength, p.s.i. | % Cohesive Failure |
| 1 | 2 | 76.9 | 23.1 | 33.3 | 33.3 | 33.3 | 902.5 | 92.5 |
| 2 | 2 | 78.4 | 21.6 | 36.4 | 36.4 | 27.2 | 929 | 98 |
| 3 | 2 | 80.0 | 20.0 | 40.0 | 40.0 | 20.0 | 965 | 100 |
| 4 | 2 | 81.6 | 18.4 | 44.5 | 44.5 | 11.0 | 951.5 | 100 |
| 5 | 2 | 82.6 | 17.4 | 47.6 | 47.6 | 4.8 | 912.5 | 100 |
| 6 | 5 | 90.0 | 10.0 | 33.3 | 33.3 | 33.3 | 870 | 100 |
| 7 | 5 | 95.0 | 5.0 | 33.3 | 33.3 | 33.3 | 881 | 100 |
| 8 | 5 | 99.0 | 1.0 | 33.3 | 33.3 | 33.3 | 877 | 96 |
| 9 | 5 | 99.9 | 0.1 | 33.3 | 33.3 | 33.3 | 322 | 0 |
| 10 | 5[2] | 76.9 | 23.1 | 33.3 | 33.3 | 33.3 | 867 | 99 |

[2]Primer composition stored three months before using in adhesion test.

EXAMPLE 9

Test panels were prepared and tested as described in Example 2, except in the room temperature vulcanizable silicone elastomer the diorganopolysiloxane contained 3,3,3-trifluoropropylmethylsiloxane units and methylvinylsiloxane units. This silicone elastomer was cured by the same mechanism as described in Example 2, namely, by using a silicon compound containing silicon-bonded hydrogen atoms and a platinum catalyst. The results were as shown in Table VII. The materials used were the same for the primer composition unless indicated otherwise.

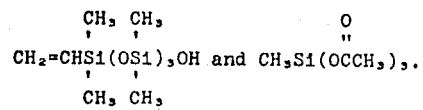

C. 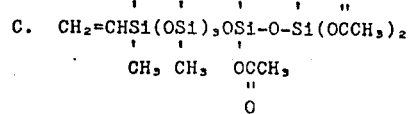

which was prepared by mixing under anhydrous conditions equal molar amounts of

Table VII

| Test No. | Number of Panels Tested | Primer Composition Weight percent Chloroethene | Weight percent Reactive Ingredients | Composition of Reactive Ingredients in weight percent |  |  | Lap Shear Test |  |
|---|---|---|---|---|---|---|---|---|
|  |  |  |  | Adhesion Promoter | Ethylpoly-silicate | Titanate | Adhesive Strength, p.s.i. | % Cohesive Failure |
| 1 | 25 | none | none | none | none | none | 77.7 | 0 |
| 2 | 4 | 100 | none | — | — | — | 80 | 0 |
| 3 | 19 | 76.9 | 23.1 | 33.3 | 33.3 | 33.3 | 569.7 | 99.5 |
| 4 | 5 | 76.9 | 23.1 | 33.3 | 33.3 | 33.3(4) | 558 | 100 |
| 5 | 5 | 90.0 | 10.0 | 33.3 | 33.3 | 33.3 | 639 | 100 |
| 6 | 5 | 95.0 | 5.0 | 33.3 | 33.3 | 33.3 | 624 | 100 |
| 7 | 5 | 99.0 | 1.0 | 33.3 | 33.3 | 33.3 | 600 | 100 |
| 8 | 4 | 99.9 | 0.1 | 33.3 | 33.3 | 33.3 | 290 | 20 |
| 9 | 2 | 82.6 | 17.4 | 47.6 | 47.6 | 4.8 | 365 | 0 |
| 10 | 5 | 82.6 | 17.4 | 47.6 | 47.6 | 4.8(4) | 542 | 43 |
| 11 | 1(5) | 76.9 | 23.1 | 33.3 | 33.3 | 33.3 | 380 | 100 |

(4) The titanate was tetraisopropyltitanate.
(5) Test panel aged after preparation for 114 days before the lap shear test was done.

EXAMPLE 10

Test panels were prepared and tested as described in Example 2, except the silicone elastomer was different and was based on a lower viscosity polydiorganosiloxane. The silicone elastomer was allowed to cure at room temperature for various lengths of time before the lap shear test was done. These times and the test results were as shown in Table VIII. The primer compositions used were as described in Table VIII using the adhesion promoter indicated and described below.

A. The same adhesion promoter as described in Example 1.

A. The same adhesion promoter as described in Example 1.

B. 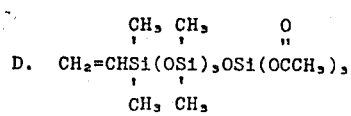

which was prepared by mixing under anhydrous conditions equal molar amounts of

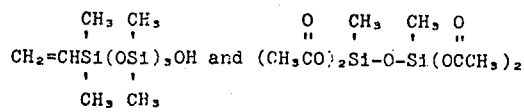

D. 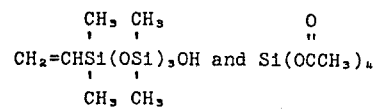

which was prepared by mixing under anhydrous conditions equal molar amounts of $CH_2=CHSi(OSi)_3OH$ and $Si(OCCH_3)_4$ with $CH_3$ groups E. Vinyltriacetoxysilane
F. Vinyltrimethoxysilane
G. The partial hydrolyzate of methyltriacetoxysilane of Example 1.

Test Numbers 2, 13, 14, 15, 21, 22 and 23 were titanium substrates. All other substrates were aluminum.

Table VIII

| Test No. | Number of Panels Tested | Length of cure before test, days | Primer Composition Weight percent Chlorothene | Weight percent Reactive Ingredients | Adhesion Promoter | Ethylpolysilicate | Titanate | Lap Shear Test Adhesive Strength, p.s.i. | % Cohesive Failure |
|---|---|---|---|---|---|---|---|---|---|
| 1[10] | 1 | 7 | none | none | none | none | none | 11 | 0 |
| 2[10] | 2 | 7 | none | none | none | none | none | 23.5 | 0 |
| 3 | 4 | 7 | 94.3 | 5.7 | 33.3A | 33.3 | 33.3 | 319.5 | 42.5 |
| 4 | 4 | 7 | 76.9 | 23.1 | 33.3A | 33.3 | 33.3 | 319 | 53.3 |
| 5 | 2 | 8 | 76.9 | 23.1 | 33.3A | 33.3 | 33.3 | 407.5 | 70 |
| 6 | 2 | 34 | 94.3 | 5.7 | 33.3A | 33.3 | 33.3 | 448 | 85 |
| 7 | 2 | 37 | 76.9 | 23.1 | 33.3A | 33.3 | 33.3 | 440 | 82.5 |
| 8 | 2 | 66 | 94.3 | 5.7 | 33.3A | 33.3 | 33.3 | 515 | 77.5 |
| 9 | 2 | 69 | 76.9 | 23.1 | 33.3A | 33.3 | 33.3 | 934 | 96 |
| 10 | 6 | 112 | 76.9 | 23.1 | 33.3A | 33.3 | 33.3 | 575.8 | 90.5 |
| 11 | 2 | 7 | 76.9 | 23.1 | 33.3B | 33.3 | 33.3 | 232.5 | 6 |
| 12 | 2 | 7 | 83.3 | 16.7 | 50 B | none | 50 | 180 | 4 |
| 13 | 2[6] | 7 | 76.9 | 23.1 | 33.3B | 33.3 | 33.3 | 365 | 5 |
| 14 | 2[6] | 26 | 76.9 | 23.1 | 33.3B | 33.3 | 33.3 | 400 | 17.5 |
| 15 | 2[6] | 48 | 76.9 | 23.1 | 33.3B | 33.3 | 33.3 | 355 | 10 |
| 16 | 2 | 7 | 76.9 | 23.1 | 33.3C | 33.3 | 33.3 | 452.5 | 67.5 |
| 17 | 2 | 18 | 76.9 | 23.1 | 33.3C | 33.3 | 33.3 | 475 | 65 |
| 18 | 2 | 39 | 76.9 | 23.1 | 33.3C | 33.3 | 33.3 | 480 | 50 |
| 19 | 2[6] | 7 | 76.9 | 23.1 | 33.3D | 33.3 | 33.3 | 82.5 | 0 |
| 20 | 2 | 7 | 76.9 | 23.1 | 33.3D | 33.3 | 33.3 | 400 | 10 |
| 21 | 2[6] | 7 | 76.9 | 23.1 | 33.3D | 33.3[9] | 33.3 | 200.5 | 0 |
| 22 | 2 | 7 | 76.9 | 23.1 | 33.3D | 33.3[9] | 33.3 | 84.0 | 0 |
| 23 | 2[7] | 7 | 99.0[8] | 1.0 | 33.3D | 33.3[9] | 33.3 | 87.5 | 0 |
| 24[10] | 2 | 7 | 83.3 | 16.7 | 50.0E | 0.0 | 50.0 | 63 | 0 |
| 25[10] | 2 | 7 | 83.3 | 16.7 | 0.0 | 50.0 | 50.0 | 72.5 | 0 |
| 26[10] | 2 | 7 | 83.3 | 16.7 | 50.0F | 0.0 | 50.0 | 66 | 0 |
| 27[10] | 2 | 10 | 76.9 | 23.1 | 33.3G | 33.3 | 33.3 | 42.5 | 0 |

[6]Primer composition painted on the substrate surface with a small brush.
[7]Primer composition sprayed on test panel from an aerosol container.
[8]Solvent was 64.6 weight percent chlorothene and 35.4 weight percent trichloromonofluoromethane.
[9]Ethylorthosilicate was used in place of the ethylpolysilicate.
[10]For comparison purposes.

EXAMPLE 11

Aluminum test panels were wiped with the primer composition as described in Example 2, a peroxide cured silicone elastomer based on a polydimethylsiloxane gum was then applied to the primed surface and cured for 1 hour at 150°C. These test panels were allowed to stand 12 days before the lap shear test was done. Ten test panels had an average adhesive strength of 516 p.s.i. with cohesive failure where the silicone elastomer contacted the primed aluminum panel.

EXAMPLE 12

An adhesion promoter was prepared by mixing equal weight ratios of

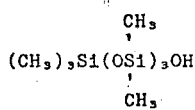

and the partial hydrolyzate of methyltriacetoxysilane defined in Example 1. A primer composition was prepared by mixing 76.9 weight percent Chlorothene and 23.1 weight percent reactive ingredients wherein the reactive ingredients were 33.3 weight percent of the adhesion promoter described above, 33.3 weight percent ethylpolysilicate and 33.3 weight percent bis(acetylacetonyl)diisopropyltitanate. Aluminum test panels were prepared and tested as described in Example 2. The average of five test panels gave an adhesive strength of 599.4 p.s.i. and 19.6 percent cohesive failure.

EXAMPLE 13

The following primer compositions were prepared by mixing the ingredients of each composition in the order shown below. These primer compositions were then used in preparing test panels as described in Example 2. The results of the lap shear test shown below in Table IX were the averages of five test panels for each set of values shown.

A. Primer composition
  96.2 weight percent Chlorothene and
  3.8 weight percent reactive ingredients
  Reactive Ingredients
  41.7 weight percent partial hydrolyzate of methyltriacetoxysilane as defined in Example 1,
  41.7 weight percent of the vinylsiloxane defined in Example 1,
  8.3 weight percent of ethylpolysilicate, and
  8.3 weight percent of bis(acetylacetonyl)diisopropyltitanate.

B. Primer Composition
  83.3 weight percent Chlorothene
  16.7 weight percent reactive ingredients
  Reactive ingredients
  25.0 weight percent vinylsiloxane as defined in Example 1,
  25.0 weight percent of the partial hydrolyzate of methyltriacetoxysilane defined in Example 1, and
  50.0 weight percent ethylpolysilicate C. Primer Composition
  83.3 weight percent Chlorothene
  16.7 weight percent reactive ingredients
  Reactive Ingredients
  25.0 weight percent vinylsiloxane as defined in Example 1, 25.0 weight percent of the partial hydrolyzate of methyltriacetoxysilane defined in Example 1, and
50.0 weight percent bis(acetylacetonyl)diisopropyltitante.
D. Primer Composition
91.0 weight percent Chlorothene
9.0 weight percent reactive ingredients
Reactive Ingredients
50.0 weight percent vinylsiloxane as defined in Example 1,
50.0 weight percent of the partial hydrolyzate of methyltriacetoxysilane defined in Example 1.
E. Primer Composition
76.9 weight percent Chlorothene
23.1 weight percent reactive ingredients
Reactive Ingredients
33.3 weight percent ethylpolysilicate
16.7 weight percent of the partial hydrolyzate of methyltriacetoxysilane as described in Example 1,
33.3 weight percent bis(acetylacetonyl)diisoproyltitanate, and
16.7 weight percent of the vinylsiloxane defined in Example 1.
F. Primer Composition
76.9 weight percent Chlorothene
23.1 weight percent reactive ingredients
Reactive Ingredients
16.7 weight percent of the vinysiloxane defined in Example 1,
16.7 weight percent of the partial hydrolyzate of methyltriacetoxysilane as described in Example 1,
33.3 weight percent ethylpolysilicate and
33.3 weight percent bis(acetylacetonyl)diisopropyltitanate.
G. Primer Composition
76.9 weight percent Chlorothene
23.1 weight percent reactive ingredients
Reactive Ingredients
16.7 weight percent of the partial hydrolyzate of methyltriacetoxysilane as described in Example 1,
16.7 weight percent of the vinylsiloxane as described in Example 1,
33.3 weight percent ethylpolysilicate, and
33.3 weight percent bis(acetylacetonyl)diisoproyltitanate.
H. Primer Composition
76.9 weight percent Chlorothene
23.1 weight percent reactive ingredients
Reactive Ingredients
33.3 weight percent ethylpolysilicate,
16.7 weight percent of the vinylsiloxane as described in Example 1,
33.3 weight percent bis(acetylacetonyl)diisopropyltitante, and
16.7 weight percent of the partial hydrolyzate of methyltriacetoxysilane as described in Example 1.

Table IX

| Primer Composition | Lap Shear Test Adhesion Strength P.S.S. | % Cohesive Failure |
|---|---|---|
| A | 853 | 99.8 |
| B | 887 | 100 |
| C | 869.4 | 100 |
| D | 870 | 98.8 |
| E | 843 | 100 |
| F | 866 | 100 |
| G | 876 | 100 |
| H | 852 | 100 |

EXAMPLE 14

A. An adhesion promoter was prepared by mixing under anhydrous conditions 24.7 parts by weight of dimethylvinylsilanol and 75.3 parts by weight of the partial hydrolyzate of methyltriacetoxysilane as defined in Example 1. A primer composition was prepared by mixing 76.9 weight percent Chlorothene and 23.1 weight percent reactive ingredients wherein the reactive ingredients were equal weight amounts of the above adhesion promoter, ethylpolysilicate and bis(acetylacetonyl)diisopropyltitanate. Aluminum test panels were prepared and tested as described in Example 2. The adhesive strength was 984 p.s.i. with 100 percent cohesive failure for an average of five panels.

B. A primer composition was prepared by mixing 76.9 weight percent Chlorothene and 23.1 weight percent reactive ingredients wherein the reactive ingredients were 16.7 weight percent dimethylvinylsilanol, 33.3 weight percent ethylpolysilicate, 33.3 weight percent bis(acetylacetonyl)-diisopropyltitanate and 16.7 weight percent methyltriacetoxysilane. Aluminum test panels were prepared and tested as described in Example 2. The adhesive strength was 927 p.s.i. with 100 percent cohesive failure for an average of five test panels.

EXAMPLE 15

Primer compositions were prepared and tested as described in Example 2, except normal-propylorthosilicate was used in place of ethylpolysilicate. The results on aluminum test panels were 765 p.s.i. with 71.5 percent cohesive failure for an average of two test panels.

EXAMPLE 16

Primer compositions were prepared and tested as described in Example 2, except the concentrations of ingredients were varied as described in Table X wherein the results were as shown for the lap shear test.

Table X

| Test No. | Number of Panels Tested | Primer Composition Weight percent Chlorothene | Weight percent Reactive Ingredients | Composition of Reactive Ingredients in weight percent Adhesion Promoter | Ethylpolysilicate | Titanate | Lap Shear Test Adhesive Strength, p.s.i. | % Cohesive Failure |
|---|---|---|---|---|---|---|---|---|
| 1 | 2 | 82.6 | 17.4 | 4.8 | 47.6 | 47.6 | 795 | 98.5 |
| 2 | 2 | 80.0 | 20.0 | 20.0 | 40.0 | 40.0 | 745 | 99.5 |
| 3 | 2 | 74.1 | 25.9 | 42.8 | 28.6 | 28.6 | 857.5 | 100 |
| 4 | 2 | 71.4 | 28.6 | 50.0 | 25.0 | 25.0 | 847.5 | 100 |

That which is claimed is:

1. A composition consisting essentially of a reaction product obtained by mixing under essentially anhydrous conditions
   1. a vinylsiloxane of the formula

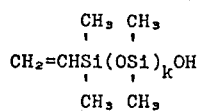

in which $k$ has an average value of from 0 to 20 inclusive where the vinylsiloxane species having values of $k$ above 20, if present, are in no more than minor amounts and
   2. An acetoxysilicon compound of the formula

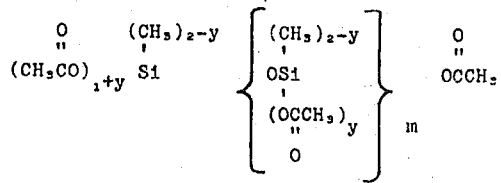

in which $m$ has an average value of from 0 to 5 inclusive and $y$ is 1 or 2, (1) and (2) being mixed in proportions to provide a ratio of hydroxyl in (1) to acetoxy in (2) of from 1/14 to 2/3.

2. The composition in accordance with claim 1 wherein $k$ is 3.

3. The composition in accordance with claim 2 wherein the ratio of hydroxyl in (1) to acetoxy is (2) is from 1/8, to 1/2.

4. The composition in accordance with claim 2 wherein $m$ is 0 and $y$ is 1.

5. The composition in accordance with claim 2 wherein $m$ is 0 and $y$ is 2.

6. The composition in accordance with claim 2 wherein $m$ is 1 and $y$ is 1.

7. The composition in accordance with claim 2 wherein $y$ is 1 and $m$ has an average value of from 0.5 to 1.

* * * * *